United States Patent [19]
Sommeria

[11] 3,815,004
[45] June 4, 1974

[54] ROTARY MOTOR

[75] Inventor: Marcel R. Sommeria, Palos Heights, Ill.

[73] Assignee: Hyper-Loop, Inc., Bridgeview, Ill.

[22] Filed: June 6, 1973

[21] Appl. No.: 367,578

[52] U.S. Cl. ................ 318/440, 318/441, 318/442
[51] Int. Cl. ............................................. H02p 5/08
[58] Field of Search .......... 318/440, 441, 442, 293, 318/439, 292, 290; 307/28, 25, 21, 43; 310/46

[56] References Cited
UNITED STATES PATENTS

| | | | |
|---|---|---|---|
| 1,631,977 | 6/1927 | Merrill | 318/440 X |
| 3,183,428 | 5/1965 | Diehl | 318/439 |
| 3,534,203 | 10/1970 | Sommeria | 310/46 X |
| 3,584,283 | 6/1971 | Lindner | 318/439 X |
| 3,641,409 | 2/1972 | Maeda | 318/293 X |
| 3,670,189 | 6/1972 | Monroe | 310/46 |

Primary Examiner—B. Dobeck
Attorney, Agent, or Firm—Hill, Gross, Simpson, Van Santen, Steadman, Chiara & Simpson

[57] ABSTRACT

A rotary motor has an armature with a single continuous winding and a pair of spaced-apart windingless pole pieces surrounding said armature and formed of ferromagnetic material. The armature employs a ferromagnetic member having a plurality of slots arranged in parallel spaced-apart relation encircling the periphery of the armature, each slot containing a pair of conductors forming separate portions of said armature winding. A commutator is mounted for rotation with the armature, and is adapted to interconnect portions of the winding with two independent electrical power sources through four spaced brushes. The independent power sources each include a plurality of rectifiers for rectifying a multiphase source of a.c. power.

8 Claims, 8 Drawing Figures

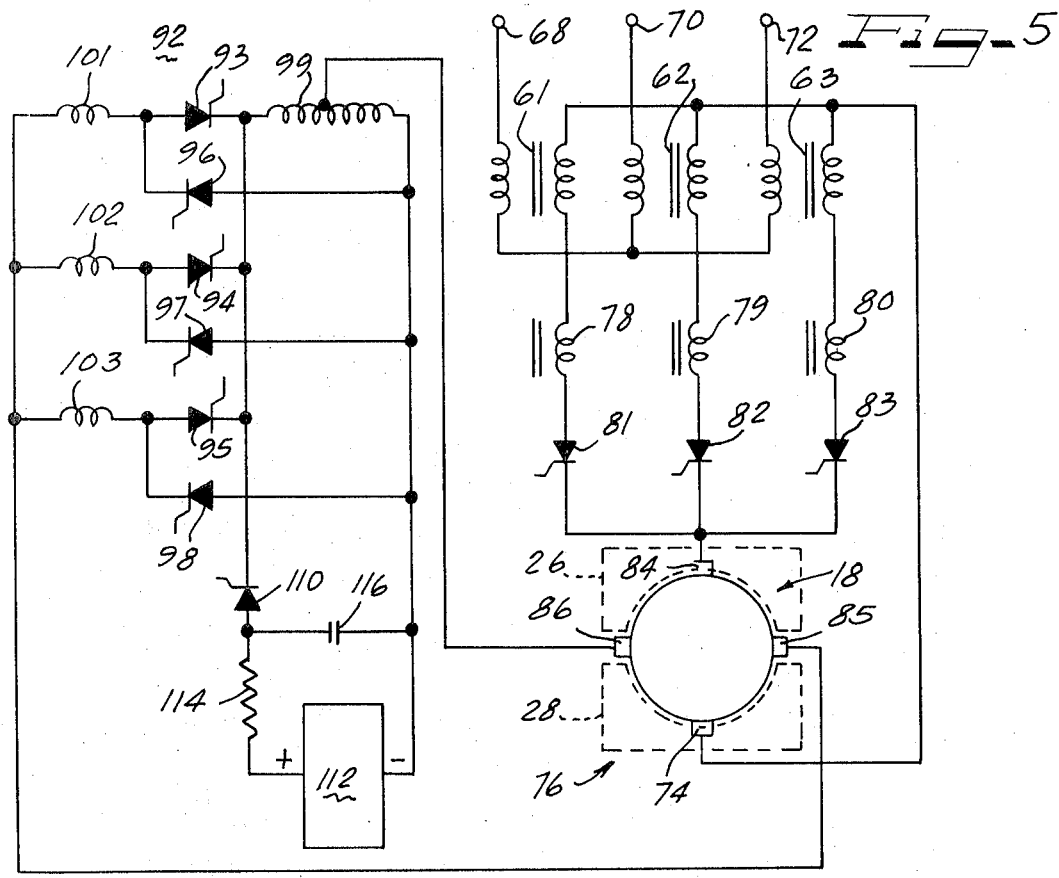
Fig-5
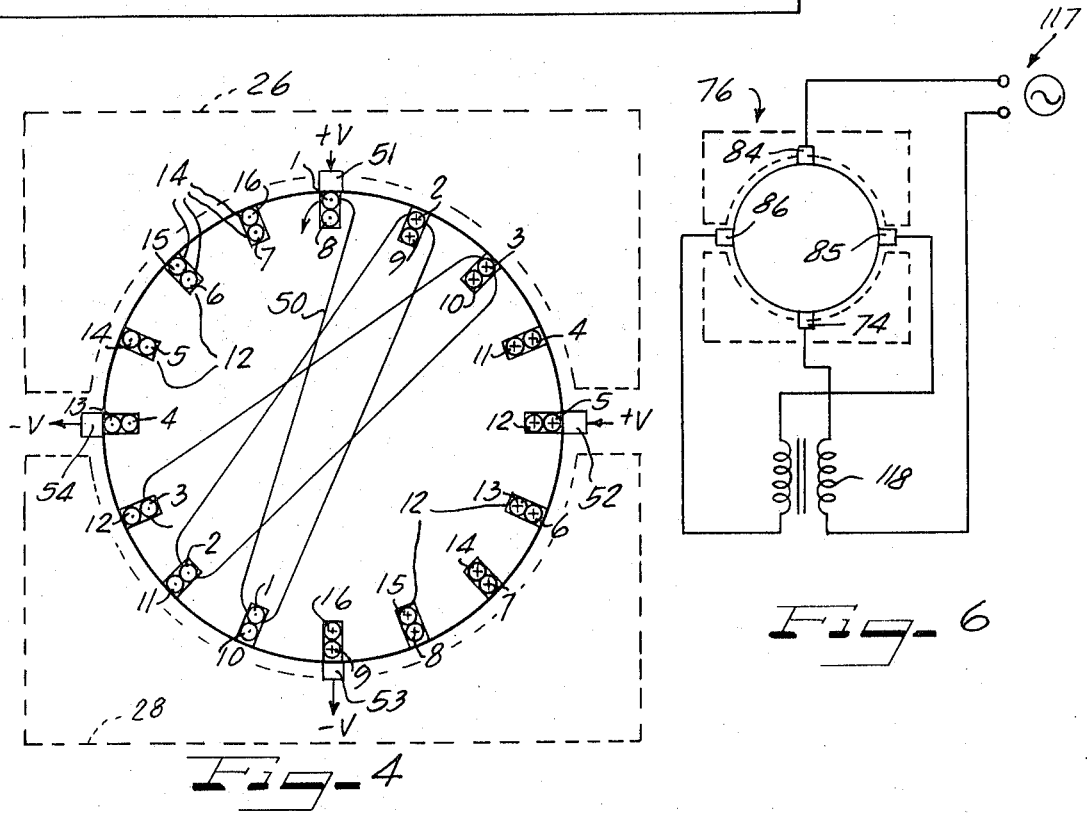
Fig-4
Fig-6

ROTARY MOTOR

BACKGROUND

1. Field of the Invention

The present invention relates to an electric motor and more particularly to such a motor in which no permanent magnets are employed and in which only a single winding is used.

2. Prior Art

Several forms of such motors are described in and claimed in my U.S. Pat. No. 3,534,203, which issued Oct. 13, 1970. A rotary motor is descirbed in the patent, and although that rotary motor operates satisfactorily for some applications, it is desirable, if possible, to improve the construction and operation of such motor.

The aforementioned patent also describes a circuit for deriving two independent sources of electrical potential for connection to the winding of a motor, but the circuit there described is limited by a construction which can produce extremely high currents through the rectifier elements under some transient conditions. It is therefore desirable, if possible, to provide a circuit producing the required sources of potential which are not subject to such limitations.

SUMMARY OF THE INVENTION

It is a principal object of the present invention to provide a motor which does not require a permanent magnet, and which employs a single winding to convert electrical energy to rotary torque, and which is not subject to the aforementioned disadvantages.

Another object of the present invention is to provide a motor arrangement which has improved operating characteristics.

Another object of the present invention is to provide a circuit for the control of a motor incorporating means for producing two independent potentials for connection to the armature of such a motor.

These and other objects and advantages of the present invention will become manifest upon an examination of the following description and the accompanying drawings.

In one embodiment of the present invention, there is provided a motor having a magnetic assembly comprising a pair of spaced-apart pole pieces formed of ferromagnetic material, an armature, said pole pieces being magnetically isolated from each other and having interior surfaces defining a cylindrical surface surrounding the exterior of said armature, said armature comprising a ferromagnetic member having a plurality of slots arranged in spaced-apart locations encircling the periphery thereof, each of said slots including a plurality of conductors, a commutator having a plurality of insulated segments, means for connecting said conductors with individual segments of said commutator, and brush means for applying a plurality of sources of electrical potential to the segments of said commutator.

In another embodiment of the present invention, there is provided a circuit for deriving a pair of independent electrical potential from a source of multiphase a.c. electrical power, including a plurality of SCR's, each phase of said multiphase power source being connected to first and second pairs of said SCR's for respectively developing first and second d.c. potentials, the SCR's of said first and second pairs being poled to prevent current flow in series through an SCR of said first pair and an SCR of said second pair.

BRIEF DESCRIPTION OF THE DRAWINGS

Reference will now be made to the accompanying drawings in which:

FIG. 4 is a schematic circuit diagram of a circuit provided for developing a pair of independent potentials to be connected with the motor of FIGS. 1–3;

FIG. 5 is a diagrammatic illustration of the manner of winding of the armature of the motor illustrated in FIGS. 1–3;

FIG. 6 is a schematic circuit diagram of a motor constructed in accordance with the present invention, connected for a.c. operation;

DESCRIPTION OF THE PREFERRED EMBODIMENTS

Figure 1:
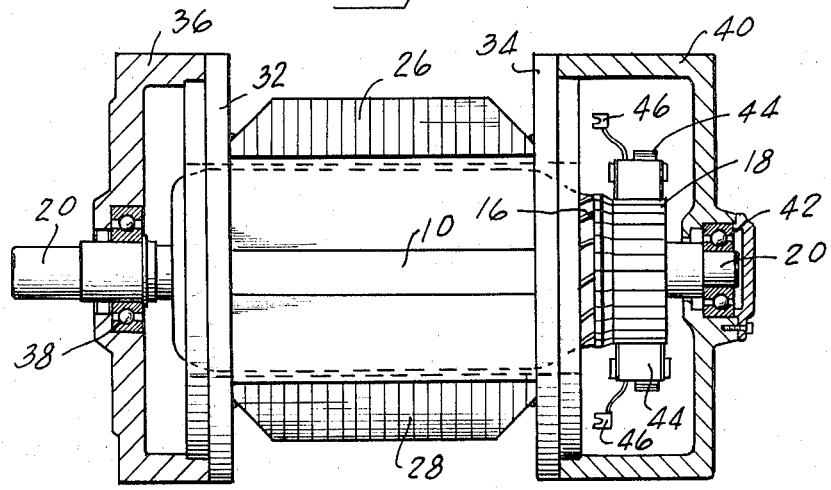
FIG. 1 is a side elevational view, partly in cross-sectiun, of a motor incorporating an illustrative embodiment of the present invention.
Figure 2:
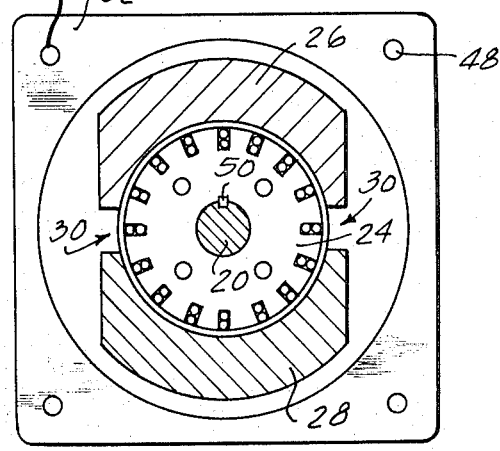
FIG. 2 is an end elevational view partly in cross-section, of a portion of the apparatus illustrated in FIG. 1.
Figure 3:
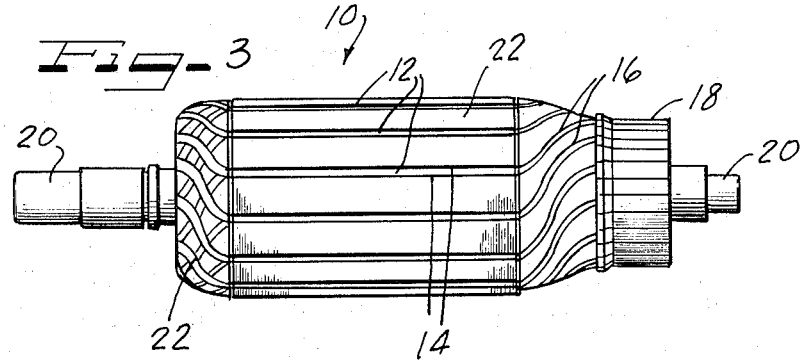
FIG. 3 is a side elevational view of an armature incorporated in the apparatus of FIG. 1.

Referring now to the drawings, a motor incorporating an illustrative embodiment of the present invention is illustrated in FIGS. 1 to 3. The motor comprises an armature having a plurality of laminated plates 24 assembled together to form a circular cylindrical body with a plurality of straight parallel slots 12 arranged in spaced-apart fashion around its periphery. A pair of conductors 14 is disposed in each of the slots 12. The conductors 14 are connected by means of wires 16 to segments of a commutator 18, which is mounted at one of the armatures for rotation therewith. The entire armature assembly is supported on a central shaft 20. At the end of the armature opposite the commutator 18, a plurality of wires 22 joins the ends of the conductors 14, so that all of such conductors are connected together in a continuous winding. One of the laminated plates 24 of the armature is illustrated in a plan view in FIG. 2. On two opposite sides of the armature 10 a pair of pole pieces 26 and 28, formed of ferromagnetic material such as soft iron or the like, is provided. They are both elongate in form and have inner surfaces defining a cylindrical surface, spaced slightly outwardly from the cylindrical surface of the armature 10. The pole pieces 26 and 28 are relatively widely spaced from each other, at their ends 30, so as to avoid leakage of magnetic flux therebetween. Each of the pole pieces 26 and 28 is formed of a plurality of laminated plates, and the laminated construction of the pole pieces is more clearly illustrated in FIG. 1. The pole pieces 26 and 28 are joined at their ends by a pair of end plates 32 and 34, and the pole pieces 26 and 28 are secured to the end plates 32 and 34 by welding or the like. The end plates 32 and 34 are formed of a non-ferromagnetic material, such as stainless steel, aluminum, or the like. When aluminum is employed for the end plates 32 and 34, the pole pieces 26 and 28 are preferably clamped to the end plates, rather than being welded thereto.

A housing 36 is provided for enclosing one end of the armature 10, and a bearing 38 is supported within an aperture of the housing 36, the bearing 38 in turn supporting an end of the shaft 20. A similar housing 40 is provided at the other end of the shaft 20, and the housing 40 incorporates a bearing assembly 42 for supporting the shaft 20. The left-hand end of the shaft 20 (as viewed in FIG. 1) extends downwardly beyond the bearing 38 and is adapted to be connected to the apparatus desired to be driven by the motor.

The housing 40 includes means for mounting a plurality of brush assemblies 44 in association with segments of the commutator 18, and a plurality of electrical conductors 46 are adapted to be connected to an electrical circuit external to the motor, for the purpose of supplying electrical power to the armature winding. The end plates 32 and 34 are provided with bolt holes 48 (FIG. 2) which facilitate mounting of the housings 36 and 40 to the end plates. The laminated plates 24 of the armature are each keyed to the shaft 20, by a key 50, so that the armature rotates with the shaft 20.

The manner in which the armature winding is formed in the slots 12 of the armature is best illustrated in FIG. 4. The slots 12 are of the so-called "open" type, in which the width of the slots is approximately equal throughout the depth of the slots. In the preferred form illustrated in FIG. 4, each slot 12 contains two conductors 14, and the conductors are all interconnected so as to form a single winding. The inner conductors, i.e., those located inwardly in the slots, and the outer conductors are separately numbered in FIG. 4, in the order in which these are interconnected to form the armature winding. Starting with the uppermost slot as illustrated in FIG. 4, the outer conductor 1 is connected by a line 50 to the inner conductor 1, then to the outer conductor 2, then to the inner conductor 2, then to the outer conductor 3, and so on. The remainder of the inner and outer conductors are interconnected in the same manner, so that the entire armature winding is one continuous electrical conductor. It will be appreciated that both ends of each outer conductor are connected to the corresponding ends of two inner conductors, so that current flowing in series through connected inner and outer conductors flows in one direction through the inner conductors and in the opposite direction through the outer conductors. The conductors are designated with a dot or with a cross, in FIG. 4, to indicate the relative direction of current flow.

FIG. 4 contains a diagrammatic illustration of four brushes, indicated by arrows 51–54. These brushes establish electrical connections to the armature conductors located at the outer ends of four slots spaced apart 90° from each other. The outer conductors are thereby connected to the external electrical circuit through the brushes 51–54. If a d.c. potential is applied between the brushes 51 and 53, communicating with the outer conductors in two opposite slots, the current between such brushes divides into two parallel paths, with the current flowing through inner and outer conductors on the right-hand half of FIG. 4 in one direction, e.g., into the plane of FIG. 4, and the current flowing through the inner and outer conductors on the left-hand half of FIG. 4 in the opposite direction.

If a second, independent source of d.c. potential is connected between the brushes 52 and 54, the current produced as a result of that potential also divides evenly in two parallel paths, producing another current. The combined currents cancel out in upper right and lower left quadrants and add up in upper left and lower right, if the currents produced by the two sources are of the same magnitude. The magnetic flux created in the upper left quadrant returns through the upper right quadrant and the adjacent pole piece. The magnetic flux created in the lower right quadrant returns through the lower left quadrant and the adjacent pole piece.

The pole pieces 26 and 28, shown in dotted lines in FIG. 4, are located in symmetrical positions relative to the four brushes 51–54, so that the magnetomotive force produced by the armature current in a single quadrant of the armature is asymmetrical relative to its adjacent pole piece. The asymmetry of the magnetomotive force and the pole piece results in a torque, urging the armature to rotate toward a position in which the flux is symmetrical with a single pole piece. Accordingly, the direction of rotation of the armature when the upper left and lower right quadrants are energized, as shown in FIG. 4, is clockwise. Each energized quadrant produces an equal amount of torque, and the torque produced by both is in the same direction. However, when the polarity of the potential applied to either one of the pairs of brushes, 51 and 53 or 52 and 54, is reversed, the upper right and lower left quadrants become energized, and the direction of rotation of the motor is reversed.

The disposition of the armature windings in slots allows for a relatively small gap between the armature 20 and the pole pieces 26 and 28, so that the reluctance of the magnetic path is at a minimum. In this way very large torques can be produced in proportion to the current flowing through the armature winding. There is little risk of saturating the magnetic path including the armature plates 24 and the pole pieces 26 and 28, however.

In a motor constructed in accordance with the present invention, the usual interaction between excitation flux and armature reaction flux is avoided. The effect of this interaction in conventional motors is to distort the magnetic field, reinforcing the field at one side of a pole piece and weakening it on the other side, until the torque-producing capacity of the motor is overcome. In the present invention, therefore, the motor is able to produce increasing amounts of torque at exceedingly high values of armature current.

Although the construction of the motor of the present invention is extremely simple and economical, surprisingly good characteristics are achieved for efficiency, ease of commutation, freedom from saturation, and the like.

A circuit diagram of a power circuit for a motor constructed in accordance with the present invention is illustrated in FIG. 5. Three transformers 61–63 are provided, and one end of the primary winding of each is connected to one of three terminals 68, 70 and 72, which in turn are adapted to be connected to a three-phase source of a.c. power. The secondary windings of the transformers 61–63 each have one end connected in common with a brush 74 of the commutator 18. The other end of each secondary winding is connected in series with the primary of one of three current transformers 78, 79, and 80, respectively, and through one of three SCR's 81, 82 and 83, respectively, to a common point which is connected to a brush 84, positioned diametrically opposite the brush 74 on the commutator 18 of the motor. The primary winding of each of the current transformers 78, 79 and 80 is connected to the anode of its respective SCR, so that current may flow only in one direction through the secondaries of the transformers 61–63 and the primaries of the transformers 78–80.

The gate terminals of the three SCR's 81, 82 and 83 are triggered by means of pulses applied thereto 120° apart, with reference to the phase of the a.c. voltage applied to the input terminals 68, 70 and 72. The time of occurrence of such pulses, in relation to the phase of the a.c. power, determines the r.m.s. voltage applied between the brushes 74 and 84 of the motor, which in turn determines the armature current flowing between these brushes. The triggering pulses are generated by conventional circuitry such as that described and claimed in my prior U.S. Pat. No. 3,548,278, issued Dec. 15, 1970.

The other two brushes 85 and 86, which may be referred to as the control brushes of the motor, are connected with an independent circuit 92. The circuit 92 incorporates six SCR's 93–98. The cathodes of the three SCR's 93–95 are connected in common to one end terminal of an inductor 99, and the anodes of the other three SCR's 96–98 are connected to the opposite end of the inductor 99. The anode of the SCR 93 and the cathode of the SCR 96 are connected in common to one terminal of the secondary winding 101 of the transformer 78. The anode of the SCR 94 and the cathode of the SCR 97 are likewise connected in common to one terminal of the secondary winding 102, of the transformer 79. The anode of the SCR 95 and the cathode of the SCR 98 are connected in common to one end of the secondary winding 103 of the transformer 80. The other end of each of the secondary windings 101–103 is connected to a brush 85 of the commutator 18, and a brush 86, disposed diametrically opposite therefrom, is connected to a center tap of the inductor 99.

The three SCR's 93–95 are each triggered simultaneously by pulses applied to their gate terminals, when rotation of the motor is desired in one direction, i.e., clockwise. When rotation is desired in the opposite (counter-clockwise) direction, the other three SCR's 96–98 have pulses applied simultaneously to their gate terminals. The direction of current flow through the inductor 99, and through the motor 76 via the brushes 85 and 86 thus is dependent upon which of the two sets of SCR's is triggered. One additional SCR 110 is provided for performing a commutating function when it is desired to change the direction of rotation of the motor 76.

A source of a d.c. potential 112 is provided for charging a capacitor 116 through a resistor 114. When it is desired to reverse the direction of rotation of the motor, the SCR 110 is triggered, and the capacitor 116 is thereby discharged through the inductor 99. This cuts off whichever of the SCR's 93–98 was conducting immediately previously, and allows other SCR's to be triggered subsequently, to reverse the direction of current flow through the brushes 85 and 86, thereby reversing the direction of rotation of the motor. The size of the capacitor 116, and the potential of the source 112 are chosen large enough to ensure quenching of the SCR's 93–98, for any condition of operation thereof. The resistor 114 permits the capacitor 116 to be charged relatively slowly, so that the source 112 need not have a large power capacity.

The application of a relatively high frequency signal to the gates of the SCR's 93–95 or to the gates of the SCR's 96–98, insures that the selected group of SCR's functions substantially as a closed circuit for conduction of current in one way between the SCR's and the brushes 85 and 86. The current transformers 78–80 are chosen to produce approximately the same r.m.s. current in the secondary winding as in the primary, so that the r.m.s. current in the circuit including the brushes 85 and 86 is substantially the same as in the circuit including the brushes 74 and 84, thus achieving a cancellation of currents in two opposed quadrants of the armature.

FIG. 6 shows a motor constructed in accordance with the present invention, connected for operation with a source of single phase a.c. voltage, applied to terminals 117. The terminals 117 are connected in series with the brushes 84 and 74, and with the primary of a transformer 118. The secondary of the transformer 118 is connected in series with the brushes 85 and 86. It is apparent that current flowing through the armature winding causes an asymmetry in the magnetic flux produced thereby, giving rise to a torque which turns the motor. The same pair of quadrants of the armature are energized for both half cycles of a.c. power applied to the terminals 117, so that the torque is continuous in one direction. The direction of rotation can be reversed by reversing the connections between the ends of the secondary of the transformer 118 and the terminals 117, by a double-pole double-throw switch, or the like. The r.m.s. current through the armature windings may be varied by means for controlling the r.m.s. voltage present at the terminals 117, by employing a conventional circuit (not shown) using a triac or two SCR's. The r.m.s. current through the armature is then a function of the conduction angle of the triac or the conduction angles of the SCR's.

Figure 7:
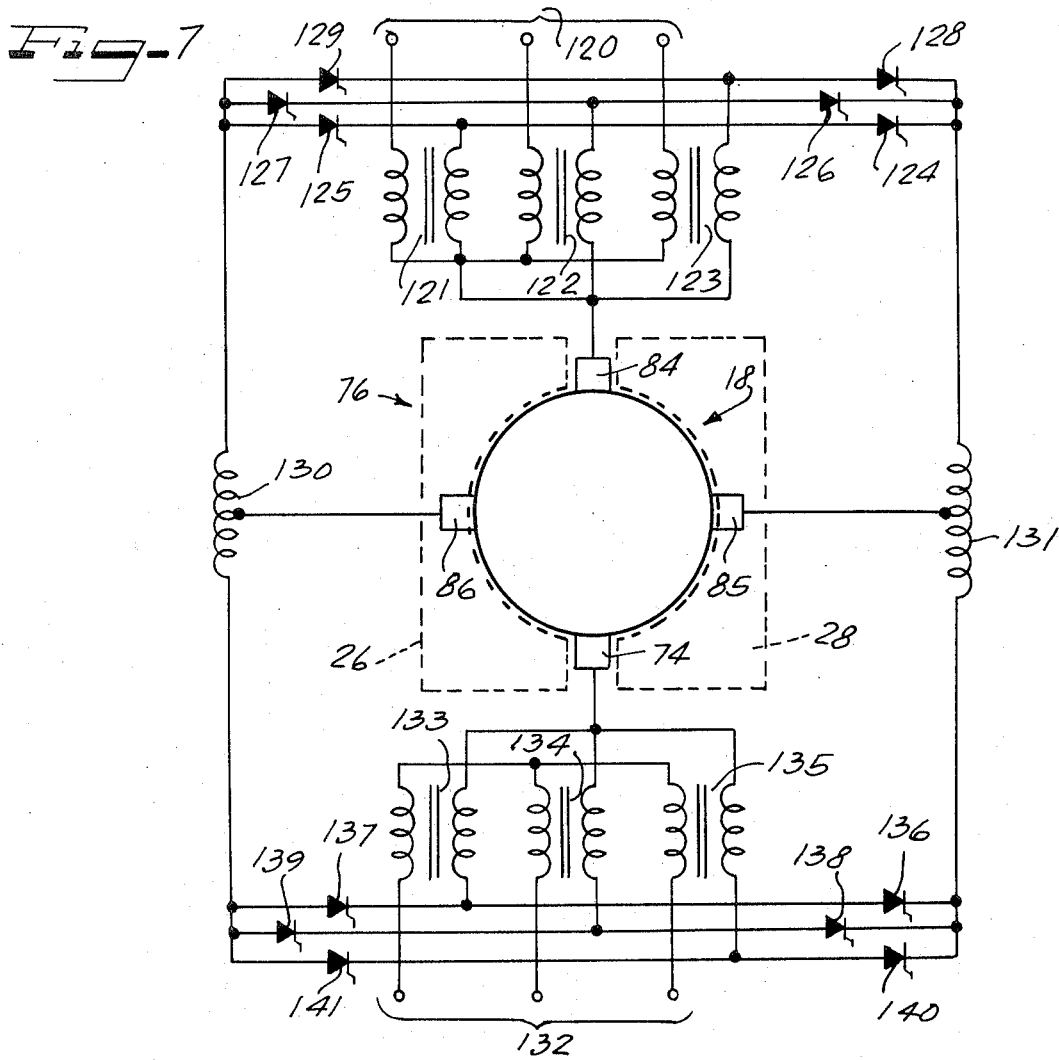
FIG. 7 is a schematic circuit diagram for an alternative arrangement for providing independent sources of potential.

In FIG. 7, an alternative arrangement for producing two independent sources of d.c. power is illustrated. The three terminals 120 are connected to a source of three-phase electrical power, and each of the terminals 120 is connected to the terminal of the primary winding of an independent transformer 121–123. The primary windings of the three transformers 121–123 are connected in wye circuit arrangements, so that the ends of the primary winding not connected to one of the terminals 120 are connected in common. The secondary windings of the three transformers 121–123 are also connected in wye circuit arrangement, and their common point is connected to the brush 84 of the commutator 18.

The remote end of each of the secondary windings is connected with an individual pair of SCR's, and specifically to the anode of one SCR of the pair and to the cathode of the other SCR of the pair. Thus, the secondary of the transformer 121 is connected to the anode of an SCR 124 and to the cathode of an SCR 125. Similarly, the secondary of the transformer 122 is connected to the anode of an SCR 126 and to the cathode of an SCR 127. In like manner, the secondary of the transformer 123 is connected to the anode of an SCR 128 and to the cathode of an SCR 129. The six SCR's 124–129 form a converter which is adapted to convert the a.c. potential developed across the secondary of each of the transformers 121–123 to a d.c. potential having a predetermined polarity. Only three of the six SCR's are triggered during successive cycles of the a.c. power applied to the terminals 120 when the motor is desired to run in one direction, and the other three SCR's are triggered instead when operation in the reverse direction is desired.

An inductor 130 is provided with one of its end terminals connected in common to the anodes of the three SCR's 125, 127 and 129. The center tap of the inductor 130 is connected to the brush 86. In like manner as inductor 131 has one of its end terminals connected in common to the cathodes of the SCR's 124, 126 and 128, and its center tap is connected to the brush 85.

A circuit similar to the circuit incorporating the SCR's 124–129 is provided to furnish a second independent source of d.c. potential for operation of the motor. A set of three terminals 132 is provdied and is adapted to be connected in parallel with the terminals 120, for energization by the three-phase a.c. source. The primary windings of three transformers 133, 134 and 135 are all connected in wye circuit arrangement, with one end connected to an individual one of the terminals 132. The secondary windings of the transformers 133–135 are also connected in wye configuration, with one terminal of each of the secondary windings connected in common to the brush 74. The other end of the secondary windings are connected with a pair of SCR's and specifically with one anode of one SCR of the pair and with the cathode of the other.

The secondary winding of the transformer 133 is connected with the anode of an SCR 136 and the cathode of an SCR 137. The secondary of the transformer 134 is connected with the anode of an SCR 138 and the cathode of an SCR 139. Similarly, the secondary of the transformer 135 is connected with an anode of an SCR 140 and the cathode of an SCR 141. The anodes of the three SCR's 137, 139 and 141 are connected in common to an end terminal of the inductor 130, and the cathodes of the three SCR's 136, 138 and 140 are connected in common with the end terminal of the inductor 131.

In operation, only three of the six SCR's 136–141 are energized during each cycle of operation, when the motor is rotating in one direction, and the other three SCR's are energized when the reverse direction of rotation is desired. Therefore, of the twelve SCR's illustrated in FIG. 7, only six are fired for clockwise rotation of the motor and the opposite six are fired for counter-clockwise rotation. In each set of three SCR's, the signals applied to the gate terminals are out of phase by 120 degrees, so that each SCR is conductive for the same conduction angle, relative to the phase of the a.c. signal applied to it.

When forward direction of the motor is desired, the SCR's 125 and 136, which are supplied with an a.c. signal in the same phase, are fired simultaneously. Firing of the SCR 125 supports a current flowing through the SCR 125, and then through the secondary winding of the transformer 121 to the brush 84, and from the brush 86 through the upper half of the inductor 130 back to the SCR 125. Thus, the direction of current flow within the armature is from the brush 84 to the brush 86.

Firing the SCR 136 supports a current flow from the SCR 136 through one-half of the inductor 131 to the brush 85, and from the brush 74 through the secondary winding of the transformer 133 back to the anode of the SCR 136. Thus, current flows within the motor from the brush 85 to the brush 74. The pattern of current flow is the same as discussed in connection with FIG. 5, and substantially no current flows in the upper right-hand quadrant of the armature, nor in the lower left-hand quadrant. The pole pieces 26 and 28 are illustrated in dashed lines in FIG. 7, and it will be appreciated that the magnetomotive force acting in the pole pieces, as a result of current flowing from the brush 84 to the brush 86, and from the brush 85 to the brush 74, is symmetrically disposed with respect to the pole pieces, resulting in a counter-clockwise rotation of the motor. The amount of torque developed by the motor during such rotation depends upon the conduction angle of the SCR's 125 and 136.

The SCR's 127 and 138 are fired simultaneously, 120 electrical degrees after the firing of the SCR's 125 and 136, so that they conduct for the same angle as the SCR's 125 and 136. In like manner, the SCR's 129 and 149 are triggered 120 electrical degrees after firing the SCR's 127 and 138.

The apparatus for generating the firing pulses for the six SCR's 125, 127, 129, 136, 138, and 140 is preferably the same as that described in my U.S. Pat. No. 3,548,278, issued Dec. 15, 1970. In that patent, apparatus is described for generating firing pulses for firing three SCR's, 120 electrical degrees apart, to permit them to conduct equally when connected with the three phases of a three-phase a.c. source. My prior patent also described apparatus for generating firing pulses for six SCR's, so that a motor controlled by such SCR's may be operated as a motor by firing three SCR's at three times during each cycle of the three phase a.c. power applied thereto, such times differing in phase by 120 degrees, and causing the system to function as a generator by firing three other SCR's at three different times in the cycle, also differing from each other by 120 degrees. The twleve SCR's of FIG. 6 are fired by the same circuit, since the SCr's 125 and 136 are fired simultaneously, and the other SCR's are all fired in pairs so that only six outputs of the firing circuit are required. When the gates of the SCR's of FIG. 7 are so controlled, the motor is caused to run alternately as a motor by firing six SCR's (in three pairs) 120 degrees apart for motoring, and firing the other six SCR's (in three pairs) 120 degrees apart for generating. In this way, precise control over the speed and instantaneous position of the motor shaft is attained, in response to an error signal developed from a servo system or the like, as described in the aforementioned patent.

Figure 8:
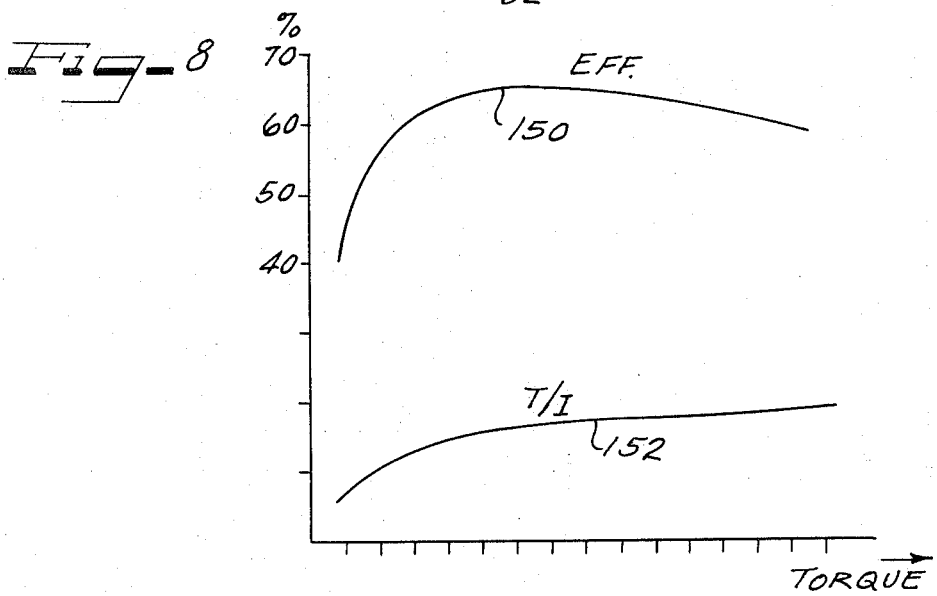
FIG. 8 is a graph showing certain characteristic curves for a motor constructed in accordance with the present invention.

The characteristics obtained for a motor incorporating the present invention are illustrated in FIG. 8. As shown therein, the efficiency of the motor, shown by the curve 150, rises rapidly with increasing torque, to a value in excess of 65 percent, and then falls only gradually for higher torques. The curve of the ratio of torque to current, plotted against torque, shows a constant slope for high values of torque, indicating lack of saturation of the motor, and responsiveness to high transient currents.

The torque produced by the motor of the present invention compares favorably with that produced by other motors which are much larger and more complicated in construction than the present motor. Moreover, the maximum torque of the motor of the present invention is not limited by saturation of the magnetic circuits of the motor, nor is any artificial limit imposed on armature current by the need to avoid demagnetizing the permanent magnets. A motor constructed in accordance with the present invention is adapted to handle extremely large short-term bursts of current, and to generate levels of torque greatly in excess of the continuous ratings of the motor.

The fact that the armature windings are enclosed entirely in slots allows a construction which is relatively slender in diameter, but which may be long in its axial length dimension. The long and slender shape allows great flexibility in placement of the motor in connection with a variety of machinery.

The commutation of a motor constructed in accordance with the present invention is extremely good, and the disadvantages resulting from poor commutation are avoided.

What is claimed is:

1. For use with a motor, a power circuit for developing two independent sources of d.c. potential for connection with four spaced-apart brushes of said motor, the combination comprising a first transformer for a first pair of said brushes, a second transformer for a second pair of said brushes, rectifier means for each of said transformers for connecting a secondary winding of each of said transformers with its respective brush, and circuit means interconnecting said first transformer with said second transformer, said rectifier means being connected by said circuit means so as to prevent current flow in a single path including both of said rectifier means.

2. Apparatus according to claim 1, wherein the primary of said second transformer is connected in series with the secondary of said first transformer, means connecting said first pair of brushes in series with the primary of said second transformer, and means connecting said second pair of brushes in series with the secondary of said second transformer.

3. Apparatus according to claim 2, including an inductor interconnected in series with said second pair of brushes.

4. Apparatus according to claim 3, wherein said inductor has two end terminals and a center tap, means connecting said center tap to one of said second pair of brushes, and means connecting the end terminals through individual rectifier means and through the secondary of said second transformer to the said second pair of brushes.

5. Apparatus according to claim 1, including a plurality of first transformers interconnected with said first pair of brushes, one for each phase of a multi-phase source of a.c. power, a plurality of rectifier means connecting the secondaries of said first transformers individually to said first pair of brushes, a plurality of said second transformers interconnected with said second pair of brushes, and a plurality of rectifier means connecting the secondaries of said second transformers individually to said second pair of brushes.

6. Apparatus according to claim 1, including a pair of inductors interconnecting the secondary of said first transformer with the secondary of said second transformer.

7. Apparatus according to claim 6, wherein each of said inductors has a center tap, and means connecting the center tap of each of said inductors with a brush of said motor.

8. Apparatus according to claim 7, including a first pair of rectifier means interconnected with an end of the secondary of said first transformer, the other end of the secondary of said first transformer being connected to one of said first pair of brushes, means for connecting said first pair of rectifier means individually to ends of said two inductors, and a second pair of rectifier means interconnected with an end of the secondary of said second transformer, the other end of the secondary of said second transformer being connected to one of said second pair of brushes.

* * * * *